(12) United States Patent
Jones et al.

(10) Patent No.: US 8,023,575 B2
(45) Date of Patent: Sep. 20, 2011

(54) APPROACH FOR SPECTRUM ANALYSIS IN A RECEIVER

(75) Inventors: Ben Jones, Austin, TX (US); Ming Ding, San Jose, CA (US); John "Jack" Morton, Austin, TX (US)

(73) Assignee: Bandspeed, Inc., Austin, TX (US)

( * ) Notice: Subject to any disclaimer, the term of this patent is extended or adjusted under 35 U.S.C. 154(b) by 731 days.

(21) Appl. No.: 11/701,560

(22) Filed: Jan. 31, 2007

(65) Prior Publication Data

US 2007/0297524 A1    Dec. 27, 2007

Related U.S. Application Data

(60) Provisional application No. 60/813,566, filed on Jun. 13, 2006.

(51) Int. Cl.
*H04L 27/28* (2006.01)

(52) U.S. Cl. ........ 375/260; 375/267; 375/347; 375/316; 375/346; 375/227; 370/210; 455/150; 702/74; 702/75; 702/78; 702/77

(58) Field of Classification Search ................ 375/260, 375/267, 347, 316, 346, 227; 370/210; 455/150; 324/76.11, 76.19, 73.22; 702/74, 75, 78, 702/77
See application file for complete search history.

(56) References Cited

U.S. PATENT DOCUMENTS

| | | | |
|---|---|---|---|
| 2,292,387 A | 8/1942 | Markey | |
| 4,328,581 A | 5/1982 | Harmon et al. | |
| 4,716,573 A | 12/1987 | Bergstrom et al. | |
| 5,079,768 A | 1/1992 | Flammer | |
| 5,323,447 A | 6/1994 | Gillis et al. | |
| 5,361,401 A | 11/1994 | Pirillo | |
| 5,377,222 A | 12/1994 | Sanderford, Jr. | |

(Continued)

FOREIGN PATENT DOCUMENTS

JP    HEI 10-107693    9/1996

(Continued)

OTHER PUBLICATIONS

The International Bureau of WIPO, "Written Opinion of the International Searching Authority", PCT/US2007/013810, dated Dec. 31, 2008, 10 pages.

(Continued)

*Primary Examiner* — Chieh M Fan
*Assistant Examiner* — Siu M Lee
(74) *Attorney, Agent, or Firm* — Hickman Palermo Truong & Becker LLP; Edward A. Becker (57) ABSTRACT

A wireless communications apparatus that it is useable as a spectrum analyzer and as a wireless receiver. The wireless communications apparatus has a radio circuit that is configured to receive EM radiation. Signal processing logic receives signals from the radio circuit based on the EM radiation. The signal processing logic has a receiver operational mode that processes the signals in accordance with a communication protocol and outputs data encoded in the signals to a host processor. The signal processing logic has a spectrum analyzer operational mode that generates frequency domain data and passes the frequency domain data to the host processor. The frequency domain data describe strength versus frequency of the EM radiation. The host processes the data in accordance with the configuration currently in use. Therefore, the wireless communications apparatus operates as a receiver in one operational mode and as a real-time spectrum analyzer in another operational mode.

29 Claims, 5 Drawing Sheets

U.S. PATENT DOCUMENTS

| | | | |
|---|---|---|---|
| 5,394,433 | A | 2/1995 | Bantz et al. |
| 5,418,839 | A | 5/1995 | Knuth et al. |
| 5,448,593 | A | 9/1995 | Hill |
| 5,515,369 | A | 5/1996 | Flammer, III et al. |
| 5,541,954 | A | 7/1996 | Emi |
| 5,737,359 | A | 4/1998 | Koivu |
| 5,809,059 | A | 9/1998 | Souissi et al. |
| 5,848,095 | A | 12/1998 | Deutsch |
| 5,933,420 | A | 8/1999 | Jaszewski et al. |
| 5,937,002 | A | 8/1999 | Andersson et al. |
| 5,956,642 | A | 9/1999 | Larsson et al. |
| 6,052,594 | A | 4/2000 | Chuang et al. |
| 6,115,407 | A | 9/2000 | Gendel et al. |
| 6,115,408 | A | 9/2000 | Gendel et al. |
| 6,118,805 | A | 9/2000 | Bergstrom et al. |
| 6,122,309 | A | 9/2000 | Bergstrom et al. |
| 6,131,013 | A | 10/2000 | Bergstrom et al. |
| 6,166,533 | A * | 12/2000 | Musha ................. 324/76.27 |
| 6,229,998 | B1 | 5/2001 | Hamdy et al. |
| 6,272,353 | B1 | 8/2001 | Dicker et al. |
| 6,370,356 | B2 | 4/2002 | Duplessis et al. |
| 6,385,237 | B1 * | 5/2002 | Tsui et al. .................. 375/228 |
| 6,389,000 | B1 | 5/2002 | Jou |
| 6,418,317 | B1 | 7/2002 | Cuffaro et al. |
| 6,477,197 | B1 * | 11/2002 | Unger ....................... 375/222 |
| 6,480,721 | B1 | 11/2002 | Sydon et al. |
| 6,487,392 | B1 | 11/2002 | Sonetaka |
| 6,512,788 | B1 | 1/2003 | Kuhn et al. |
| 6,577,611 | B1 | 6/2003 | Tat et al. |
| 6,628,735 | B1 * | 9/2003 | Belotserkovsky et al. ... 375/355 |
| 6,694,141 | B1 | 2/2004 | Pulkkinen et al. |
| 6,714,605 | B2 | 3/2004 | Sugar et al. |
| 6,760,319 | B1 | 7/2004 | Gerten et al. |
| 6,934,340 | B1 | 8/2005 | Dollard |
| 6,965,590 | B1 | 11/2005 | Schmidl et al. |
| 7,050,402 | B2 | 5/2006 | Schmidl et al. |
| 7,050,479 | B1 | 5/2006 | Kim |
| 7,079,568 | B1 | 7/2006 | Boetzel et al. |
| 7,280,580 | B1 | 10/2007 | Haartsen |
| 7,440,484 | B2 | 10/2008 | Schmidl et al. |
| 2003/0061010 | A1 * | 3/2003 | Durston ..................... 702/189 |
| 2004/0008617 | A1 * | 1/2004 | Dabak et al. ................ 370/208 |
| 2005/0058076 | A1 * | 3/2005 | Richardson et al. ......... 370/241 |
| 2005/0131976 | A1 | 6/2005 | Sunwoo |
| 2005/0164642 | A1 * | 7/2005 | Roberts ..................... 455/67.13 |
| 2005/0237921 | A1 * | 10/2005 | Showmake ................. 370/208 |
| 2006/0215774 | A1 * | 9/2006 | Shor .......................... 375/260 |
| 2007/0091814 | A1 * | 4/2007 | Leung et al. ................ 370/252 |
| 2009/0046625 | A1 * | 2/2009 | Diener et al. ............... 370/319 |

FOREIGN PATENT DOCUMENTS

| | | |
|---|---|---|
| WO | WO 97/01256 A1 | 1/1997 |
| WO | WO 2006/007599 A2 | 1/2006 |

OTHER PUBLICATIONS

Claims, PCT/US2007/013810, 3 pages.
European Patent Office, "International Search Report", PCT/US2007/013810, dated Mar. 12, 2008, 12 pages.
Claims, PCT/US2007/013810, 6 pages.
Airmagnet, "Spectrum Analyzer—Wi-Fi Spectrum Control", AirMagnet Inc., 2006, 2 pages.
Cognio, "The Cognio™ Spectrum Expert™ for RFID", Cognio Inc., 2006, 2 pages.
Bumblebee, "Precision Calibrated Spectrum Analyzer", BumbleBee™, printed Jun. 12, 2006, 12 pages.
Cognio, "Product Documentation—Cognio Spectrum Sensor Model 400 Quick Start Guide", Document No. 61109-003 R1.0, Draft 1.01, Cognio, Inc., dated Nov. 19, 2004, 11 pages.
Bandspeed Inc., "Adaptive Frequency Hopping, a Non-collaborative Coexistence Mechanism" Project: IEEE P802.15 Working Group for Wireless Personal Area Networks (WPANs), Dated May 16, 2001, 25 pages.
Batra et al., "Proposal for Intelligent BT Frequency Hopping for Enchanced Coexistence", Project: IEEE P802.15 Working Group for Wireless Personal Area Networks (WPANs), Dated Jan. 15, 2001, 13 pages.
Bluetooth, "Bluetooth Technology: The True Hollywood Story", Internet website, http://www.bluetooth.com/English/Press/Pages/PressReleasesDetail.aspx?ID=30, last visited Apr. 13, 2010, 1 page.
Bluetooth, "Bluetooth Specification, 4.5 Payload Format", Version 1.0B, Dated Nov. 29, 1999, 7 pages.
Braun, Hans-Joachin, "Advanced Weaponry of the Starts", American Heritage of Invention & Technology Magazine, vol. 12 No. 4, 1997, 9 pages.
Chen et al., "Selective Hopping for Hit Avoidance", Project: IEEE P802.15 Working Group for Wireless Personal Area Networks (WPANs), Integrated Programmable Communications, Inc., Dated Jan. 15, 2001, 17 pages.
Gan et al., "Adaptive Frequency Hopping Ad-hoc Group Update" Bandspeed Inc., Project: IEEE P802.15 Working Group for Wireless Personal Area Networks (WPANs), Dates May 16, 2001, 14 pages.
Gan et al., "Adaptive Frequency Hopping, Implementation Proposals for IEEE", Bandspeed Ltd., Dated Nov. 2000, 28 pages.
Gan et al., "Adaptive Frequency Hopping, a Non-collaborative Coexistence Mechanism", Project: IEEE P802.15 Working Group for Wireless Personal Area Networks (WPANs), Bandspeed Inc., Dated Mar. 12, 2001, 40 pages.
Gan et al., "Fundamentals of Adaptive Frequency Hopping", Project: IEEE P802.15 Working Group for Wireless Personal Area Networks (WPANs), Bandspeed Inc., Dated Mar. 27, 2001, 4 pages.
Hills, "Terrestrial Wireless Networks", Scientific American Magazine, Dated Apr. 1998, 9 pages.
Homerf, "Interference Immunity of 2.4 GHz Wireless LANs", Dated Jan. 8, 2001, 10 pages.
Homerf, "HomeRF Specification HomeRF", Revision 2.01, Dated Jul. 1, 2002, 526 pages.
Hughes et al, "Spread Spectrum Radio", Scientific American Magazine, vol. 278, No. 4, Dated Apr. 1998, 6 pages.
IEEE, "Letter to Coexistence Mechanism Submitters", IEEE P802.15 Working Group for Wireless Personal Area Networks (WPANs), Dated Jan. 29, 2001, 5 pages.
IEEE, "Non-Collaborative AFH Mechanism", IEEE P802.15 Working Group for Wireless Personal Area Networks (WPANs), Dated Jun. 15, 2001, 4 pages.
IEEE, "Adaptive Frequency Hopping Ad-Hoc Group Update", IEEE P802.15 Working Group for Wireless Personal Area Networks (WPANs), Dates May 10, 2001, 15 pages.
Kostic et al., "Dynamic Frequency Hopping in Wireless Cellular Stystems Simulations of Full-Replacement and Reduced-Overhead Methods", Dated 1999, 5 pages.
Sapozhnykov et al., "Adaptive Frequency Hopping—Instant Channel Replacement: Simulation results", Project: IEEE P802.15 Working Group for Wireless Personal Area Networks (WPANs), Dated Oct. 3, 2001, 9 pages.
Bluetooth, "Specification of the Bluetooth System" Specification vol. 1, Dated Dec. 1, 1999, 4 pages.
Wenner, "Hedy Lamarr: Not Just a Pretty Face", Internet website Scientific American, http://www.scientificamerican.com/article.cfm?id=hedy-lamarr-not-just-a-pr, Dated Jun. 3, 2008, 3 pages.
Zander, "Adaptive Frequency Hopping in HF Communications", IEE Proc-Commun., vol. 142, No. 2, Dated Apr. 2, 1995, 99 pages.
United States District Court for the Western District of Texas Austin Division, Joint Invalidity Contentions, *Bandspeed, Inc . vs. Sony Electronics Inc. and Cambridge Silicon Radio Limited*, Civil Action No. A09-CA-593-LY, 24 pages, dated Jul. 16, 2010.
Defendants Joint Invalidity Contentions, Exhibit A, *Bandspeed, Inc. v. Sony Electronics Inc.*, No. A-09-CA-593-LY, U.S. Patent No. 5,323, 447, Filed Nov. 1, 1991 to Gillis et al., 137 pages.
Defendants Joint Invalidity Contentions, Exhibit A2, *Bandspeed, Inc. v. Sony Electronics Inc.*, No. A-09-CA-593-LY, U.S. Patent No. 5,323, 447, Filed Nov. 1, 1991 to Gillis et al., 70 pages.
Defendants Joint Invalidity Contentions, Exhibit B1, *Bandspeed, Inc. v. Sony Electronics Inc.*, No. A-09-CA-593-LY, U.S. Patent No. 7,440,484 filed Apr. 19, 2001 to Schmidl et al., 79 pages.
Defendants Joint Invalidity Contentions, Exhibit B2, *Bandspeed, Inc. v. Sony Electronics Inc.*, No. A-09-CA-593-LY, U.S. Patent No. 7,440,484 filed Apr. 19, 2001 to Schmidl et al., 67 pages.

Defendants Joint Invalidity Contentions, Exhibit C1, *Bandspeed, Inc. v. Sony Electronics Inc.*, No. A-09-CA-593-LY, U.S. Patent No. 6,272,353 filed Aug. 20, 1999 to Dicker et al., 122 pages.

Defendants Joint Invalidity Contentions, Exhibit C2, *Bandspeed, Inc. v. Sony Electronics Inc.*, No. A-09-CA-593-LY, U.S. Patent No. 6,272,353 filed Aug. 20, 1999 to Dicker et al., 74 pages.

Defendants Joint Invalidity Contentions, Exhibit D1, *Bandspeed, Inc. v. Sony Electronics Inc.*, No. A-09-CA-593-LY, U.S. Patent No. 6,760,319 filed Jul. 5, 2000 to Gerten et al., 72 pages.

Defendants Joint Invalidity Contentions, Exhibit D2, *Bandspeed, Inc. v. Sony Electronics Inc.*, No. A-09-CA-593-LY, U.S. Patent No. 6,760,319 filed Jul. 5, 2000 to Gerten et al., 32 pages.

Defendants Joint Invalidity Contentions, Exhibit E1, *Bandspeed, Inc. v. Sony Electronics Inc.*, No. A-09-CA-593-LY, U.S. Patent No. 6,115,407, filed Apr. 3, 1998 to Gendel et al., 104 pages.

Defendants Joint Invalidity Contentions, Exhibit E2, *Bandspeed, Inc. v. Sony Electronics Inc.*, No. A-09-CA-593-LY, U.S. Patent No. 6,115,407, filed Apr. 3, 1998 to Gendel et al., 68 pages.

Defendants Joint Invalidity Contentions, Exhibit F1, *Bandspeed, Inc. v. Sony Electronics Inc.*, No. A-09-CA-593-LY, U.S. Patent No. 5,937,002 filed Jun. 13, 1995 to Andersson et al., 152 pages.

Defendants Joint Invalidity Contentions, Exhibit F2, *Bandspeed, Inc. v. Sony Electronics Inc.*, No. A-09-CA-593-LY, U.S. Patent No. 5,937,002 filed Jun. 13, 1995 to Andersson et al., 86 pages.

Defendants Joint Invalidity Contentions, Exhibit G1, *Bandspeed, Inc. v. Sony Electronics Inc.*, No. A-09-CA-593-LY, Japanese No. 10-107693, filed Sep. 30, 1996 to Hei, 66 pages.

Defendants Joint Invalidity Contentions, Exhibit G2, *Bandspeed, Inc. v. Sony Electronics Inc.*, No. A-09-CA-593-LY, Japanese No. 10-107693, filed Sep. 30, 1996 to Hei, 34 pages.

Defendants Joint Invalidity Contentions, Exhibit H1, *Bandspeed, Inc. v. Sony Electronics Inc.*, No. A-09-CA-593-LY, U.S. Patent No. 7,050,479, filed May 12, 2000 to Kim, 74 pages.

Defendants Joint Invalidity Contentions, Exhibit H2, *Bandspeed, Inc. v. Sony Electronics Inc.*, No. A-09-CA-593-LY, U.S. Patent No. 7,050,479, filed May 12, 2000 to Kim, 32 pages.

Defendants Joint Invalidity Contentions, Exhibit I1, *Bandspeed, Inc. v. Sony Electronics Inc.*, No. A-09-CA-593-LY, U.S. Patent No. 5,737,359 filed May 10, 1995 to Koivu, 78 pages.

Defendants Joint Invalidity Contentions, Exhibit I2, *Bandspeed, Inc. v. Sony Electronics Inc.*, No. A-09-CA-593-LY, U.S. Patent No. 5,737,359 filed Apr. 7, 1998 to Koivu, 44 pages.

Defendants Joint Invalidity Contentions, Exhibit J1, *Bandspeed, Inc. v. Sony Electronics Inc.*, No. A-09-CA-593-LY, U.S. Patent No. 7,280,580, filed Oct. 15, 1999 to Haartsen, 62 pages.

Defendants Joint Invalidity Contentions, Exhibit J2, *Bandspeed, Inc. v. Sony Electronics Inc.*, No. A-09-CA-593-LY, U.S. Patent No. 7,280,580, filed Oct. 15, 1999 to Haartsen, 26 pages.

Defendants Joint Invalidity Contentions, Exhibit K1, *Bandspeed, Inc. v. Sony Electronics Inc.*, No. A-09-CA-593-LY, U.S. Patent No. 7,079,568 filed May 26, 2000 (priority) to Boetzel et al., 43 pages.

Defendants Joint Invalidity Contentions, Exhibit K2, *Bandspeed, Inc. v. Sony Electronics Inc.*, No. A-09-CA-593-LY, U.S. Patent No. 7,079,568 filed May 26, 2000 (priority) to Boetzel et al., 20 pages.

Defendants Joint Invalidity Contentions, Exhibit L1, *Bandspeed, Inc. v. Sony Electronics Inc.*, No. A-09-CA-593-LY, U.S. Patent No. 4,716,573 filed Nov. 8, 1995 to Bergstrom et al., 42 pages.

Defendants Joint Invalidity Contentions, Exhibit L2, *Bandspeed, Inc. v. Sony Electronics Inc.*, No. A-09-CA-593-LY, U.S. Patent No. 4,716,573 filed Nov. 8, 1995 to Bergstrom et al., 20 pages.

Defendants Joint Invalidity Contentions, Exhibit M, *Bandspeed, Inc. v. Sony Electronics Inc.*, No. A-09-CA-593-LY, U.S. Patent No. 5,848,095 filed May 17, 1996 to Deutsch, 30 pages.

Defendants Joint Invalidity Contentions, Exhibit N, *Bandspeed, Inc. v. Sony Electronics Inc.*, No. A-09-CA-593-LY, Specification of the Bluetooth System, Specification vol. 1.0b, Dec. 1, 1999, 2 pages.

Defendants Joint Invalidity Contentions, Exhibit O, *Banspeed, Inc. v. Sony Electronics Inc.*, No. A-09-CA-593-LY, U.S. Patent No. 6,965,590 filed Jul. 7, 2000 to Schmidl et al., 10 pages.

Defendants Joint Invalidity Contentions, Exhibit P, *Bandspeed, Inc. v. Sony Electronics Inc.*, No. A-09-CA-593-LY, Kistic, et al., "Dynamic Frequency Hopping in Wireless Cellular Systems-Simulations of Full Replacement and Reduced Overhead Methods", IEEE Published May 1999, 12 pages.

Defendants Joint Invalidity Contentions, Exhibit Q, *Bandspeed, Inc. v. Sony Electronics Inc.*, No. A-09-CA-593-LY, U.S. Patent No. 5,956,642 filed Nov. 25, 1996 to Larsson et al., 10 pages.

Defendants Joint Invalidity Contentions, Exhibit R, *Bandspeed, Inc. v. Sony Electronics Inc.*, No. A-09-CA-593-LY, U.S. Patent No. 6,418,317 filed Dec. 1, 1999 to Cuffaro et al, 5 pages.

Defendants Joint Invalidity Contentions, Exhibit S, *Bandspeed, Inc. v. Sony Electronics Inc.*, No. A-09-CA-593-LY, U.S. Patent No. 6,052,594 filed Apr. 30, 1997 to Chuang et al., 4 pages.

Defendants Joint Invalidity Contentions, Exhibit T, *Bandspeed, Inc. v. Sony Electronics Inc.*, No. A-09-CA-593-LY, U.S. Patent No. 6,370,356 filed Oct. 19, 1998 to Duplessis et al., 2 pages.

Defendants Joint Invalidity Contentions, Exhibit U, *Bandspeed, Inc. v. Sony Electronics Inc.*, No. A-09-CA-593-LY, U.S. Patent No. 6,487,392 filed Dec. 6, 1999 to Sonetaka, 6 pages.

* cited by examiner

APPROACH FOR SPECTRUM ANALYSIS IN A RECEIVER

RELATED APPLICATION

This application claims priority from U.S. Provisional Patent Application No. 60/813,566, entitled "APPROACH FOR SPECTRUM ANALYSIS IN A BASEBAND RECEIVER," filed Jun. 13, 2006 by Ben Jones, Ming Ding and Jack Morton, the contents of which are incorporated herein by reference in their entirety for all purposes.

FIELD OF THE INVENTION

The present invention generally relates to wireless communications, and more specifically, to radio frequency monitoring, interference identification, and spectrum analysis.

BACKGROUND

Wireless communication devices and wireless networks have proliferated in recent years. Unfortunately, electromagnetic (EM) interference causes significant problems for such wireless devices and networks. The EM interference can arise from other communication devices even if those other devices use a different carrier frequency. For example, a cordless telephone using a first carrier frequency could generate EM interference that makes it difficult for a communication device using a second carrier frequency to maintain connection to a local area network (LAN). The EM interference might also arise from electronic devices other than communication devices. For example, operation of a microwave oven might cause EM interference to a communication device.

Determining what electronic device or devices are causing the EM interference can be challenging. One reason for the challenge is that the interfering device might only be used sporadically. Another reason is that the interfering device could be mobile. A possible technique to assist in locating interfering devices is to detect and classify potentially interfering EM radiation.

As an example, a particular wireless communication device that operates in compliance with an 802.11 protocol might be experiencing periodic problems associated with EM interference. Determining if there is EM radiation present other than 802.11 signals could help to locate the interfering device. For example, if this other EM radiation could be classified or characterized by spectral content, then it could be easier to determine what devices are causing interference. Spectral content can be determined and displayed by a spectrum analyzer, which displays signals in the frequency domain.

As a particular example, a microwave oven might have a spectral content that, in effect, fingerprints it as a microwave oven. For example, a microwave oven might have a spectral content with a particular shape that "hops" around randomly over time. If the spectral content could be displayed to a network administrator, the network administrator could determine that the interference might be due to a microwave oven and look for a microwave oven in the general region of the device experiencing EM interference. However, if the spectral content suggests that the interfering device is a cordless telephone, then the network administrator can take action based on this knowledge.

There are other reasons why it could be desirable to have knowledge of the spectral content in the vicinity of a wireless communication device. For example, there are certain frequency bands that are reserved for a special purpose, but which may be used for a general purpose providing that no device is using the band for the special purpose. To implement this protocol, there are communication regulatory requirements that require a device using the band for general purpose communication to vacate the band when used for the special device. For example, if a certain radar frequency band is being used by a first device for the special purpose, then that band must be vacated by a second device using the band for a general purpose. The second device learns about the special use by detecting frequency modulations referred to as "chirps". Thus, detecting such chirps, which is a type of spectral content, is important for complying with regulations.

Thus, it would be desirable to provide a spectrum analysis of EM radiation in the vicinity of a wireless communication device or network.

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section. Patent Application of Ben JONES, et al.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF THE INVENTION

An approach for spectrum analysis in a wireless receiver is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. In some instances, flow diagrams are used to depict steps performed in various embodiments of the invention. The invention is not limited to the particular order of steps depicted in the figures and the order may vary, depending upon the requirements of a particular implementation. Furthermore, steps that are depicted and described may be removed and/or other steps may be added, depending upon the requirements of a particular implementation. Various aspects of the invention are described hereinafter in the following sections:

I. OVERVIEW
II. EXAMPLE WIRELESS RECEIVER/SPECTRUM ANALYZER
III. EXAMPLE SIGNAL PROCESSING LOGIC
IV. EXAMPLE OPERATION OF SIGNAL PROCESSING LOGIC IN RECEIVER MODE
V. MODIFYING SIGNAL PROCESSING LOGIC TO SPECTRUM ANALYZER MODE
VI. EXAMPLE OPERATION OF SIGNAL PROCESSING LOGIC IN SPECTRUM ANALYZER MODE
VII. EXAMPLE PROCESS FLOW
VIII. IMPLEMENTATIONS MECHANISMS AND HARDWARE OVERVIEW
IX. EXTENSIONS AND ALTERNATIVES

Overview

In one embodiment, a wireless radio frequency (RF) receiver is re-configured such that it is used as a general-purpose real-time spectrum analyzer. As an example, the receiver might be an orthogonal frequency division multiplexing (OFDM) receiver.

In one embodiment, a wireless communications apparatus has a radio circuit that is configured to receive EM radiation. Signal processing logic coupled to the radio circuit receives signals based on the EM radiation. The signal processing logic has a receiver operational mode in which the signals are processed in accordance with a communication protocol and data encoded in the signals are transferred to a host processor. For example, the signal processing logic could process orthogonal frequency division multiplexed (OFDM) signals and pass data encoded in the OFDM signals to the host. The signal processing logic has a spectrum analyzer operational mode that generates frequency domain data, based on the signals from the radio circuit, and passes the frequency domain data to the host processor. Because the signals are based on the EM radiation, the frequency domain data describe strength versus frequency of the EM radiation received by the radio circuit. The host processes the frequency domain data to function as a real-time spectrum analyzer. Therefore, the wireless communications apparatus operates as a wireless receiver in one operational mode and as a real-time spectrum analyzer in another operational mode.

A reconfigurable signal processing device is described herein, in accordance with an embodiment of the present invention. The reconfigurable signal processing device may be used as a part of a wireless communication apparatus. The reconfigurable signal processing device has a first operational mode that is configured to process, in accordance with a communication protocol, signals received by the device to determine data encoded in the signals and to output the data encoded in the signals. The reconfigurable signal processing device has a second operational mode that is configured to generate and output frequency domain data representing signals received by the device. The frequency domain data includes strength of the signal versus frequency. The reconfigurable signal processing device has logic that is able to switch between the first operational mode and the second operational mode. For example, the second operational mode may be realized by selective use of at least a portion of the first operational mode.

Example Wireless Receiver/Spectrum Analyzer

Figure 1:
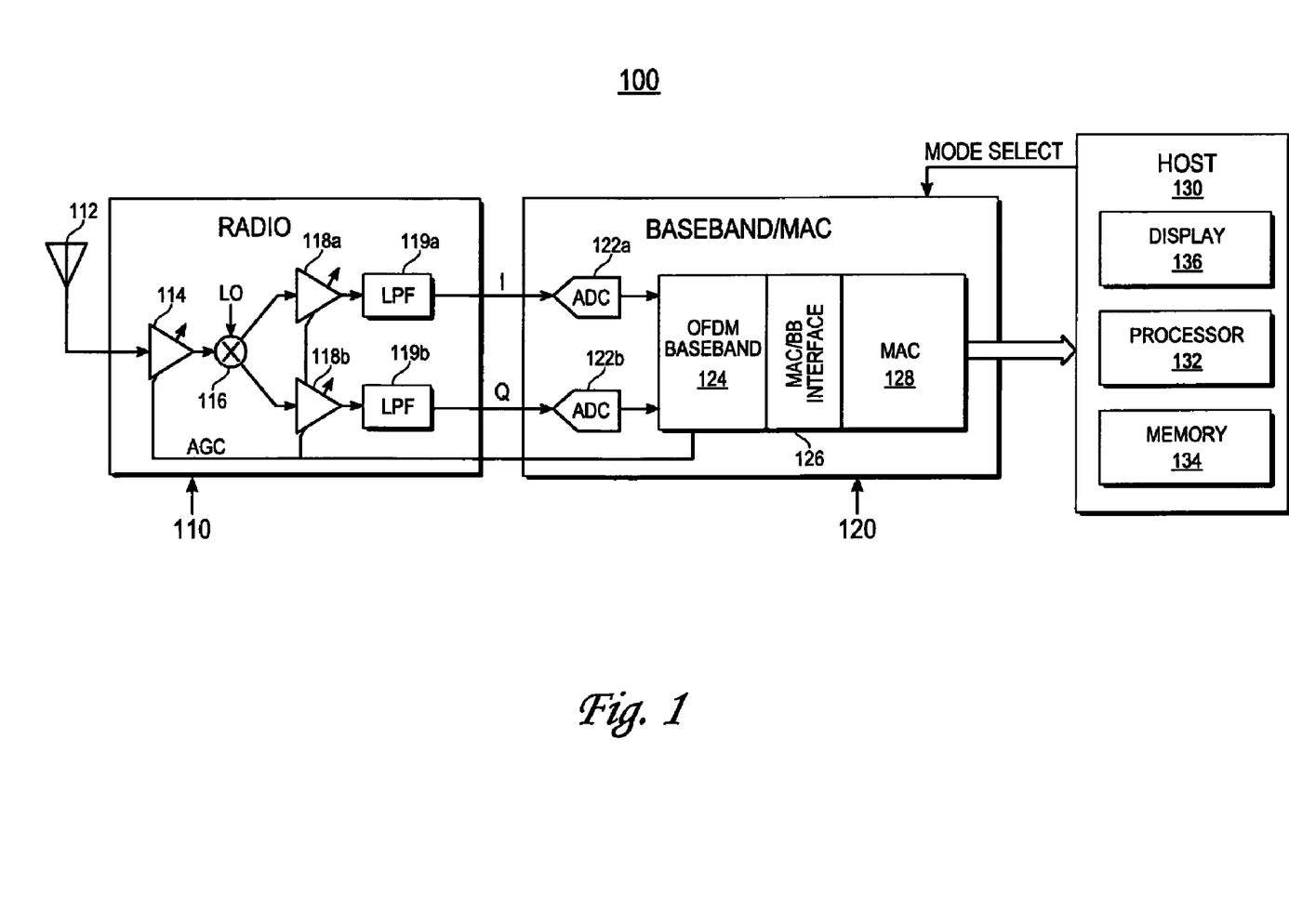
FIG. 1 is a block diagram that depicts an example wireless receiver that is re-configurable for use as a spectrum analyzer, according to an embodiment.

FIG. 1 is a block diagram that depicts an example wireless receiver 100 that is re-configurable for use as a spectrum analyzer, according to an embodiment. The wireless receiver 100 has a "receiver operational mode" and a "spectrum analyzer" operational mode. In the embodiment depicted in FIG. 1, the wireless receiver 100 is an OFDM wireless receiver. The example wireless receiver 100 comprises a radio circuit 110, a baseband/MAC component 120, and a host 130.

The radio circuit 110 receives EM radiation through an antenna 112 and provides an in-phase (I) analog signal and a quadrature (Q) analog signal to the baseband/MAC component 120. The I signal is also referred to herein as a "real component." The Q signal is also referred to herein as an "imaginary component." The radio circuit 110 is a zero-IF architecture, in this embodiment. However, the wireless receiver 100 could have a radio circuit 110 other than a zero-IF architecture. An antenna 112 is configured to receive EM radiation and transfer signals based on the EM radiation to a radio frequency (RF) gain control amplifier 114. In particular, the antenna 112 may be configured for best reception at the RF portion of the EM spectrum. The signal ("RF amplifier signal") that is output from the RF gain controlled amplifier 114 is mixed with two different oscillator signals from a local oscillator (LO) by mixer 116 to quadrature mix the RF amplifier signal down to baseband. The two LO signals are 90 degrees out of phase with each other. The mixer 116 outputs two signals, which are passed through the intermediate frequency (IF) gain controlled amplifiers 118a, 118b and low pass filters (LPF) 119a, 119b. The output of the LPFs 119a, 119b are the analog I signal and the analog Q signal, which are at baseband.

The baseband/MAC 120 controls the gain of the RF gain controlled amplifier 114 and IF gain controlled amplifiers 118 with an automatic gain control signal (AGC). The AGC signal is used in both the receiver operational mode and the spectrum analyzer operational mode. The strength of EM radiation that interferes with reception can vary greatly, especially if the wireless receiver 100 is moved in an attempt to locate such signals. Therefore, controlling amplifier gain when used in the spectrum analyzer operational mode allows for processing EM radiation having a very wide dynamic range of signal strength.

The baseband/MAC 120 has analog-to-digital converters (ADC) 122a, 122b to digitize the analog I and Q signals received from the radio circuit 110. The digitized I and Q signals are input to the OFDM baseband 124, which performs physical layer demodulation and decoding. The processed data are passed by the MAC baseband interface 126 to the MAC 128, which performs media access control protocol functions. The MAC 128 sends packetized data to the host 130.

When used as a baseband receiver, the baseband/MAC 120 detects and processes packets contained in the I and Q signals. More particularly, the baseband/MAC 120 extracts data that is encoded in the I and Q signals and passes the data to the host 130. That is, the wireless receiver 100 is configured to receive and process packets in accordance with one or more different communication protocols. As an example, the wireless receiver 100 may be configured to detect and process packets in accordance with an IEEE 802.11 protocol. However, the wireless receiver 100 can be used for a wide variety of protocols. Other example protocols include, but are not limited to, WiMax (Worldwide Interoperability for Microwave Access), WiBro (Wireless Broadband), and frequency hopping OFDM.

When used as a spectrum analyzer, the baseband/MAC 120 does not need to detect and process packets. Rather, the OFDM baseband 124 generates frequency domain data based on the I and Q signals. Because the I and Q signals are based on the EM radiation, the frequency domain data describe spectral content for the EM radiation received by the antenna 112. The MAC/baseband interface 126 packetizes the frequency domain data, and passes the packets on to the MAC 128. The packets can include metadata, such as scaling information that is based in part, on the gain of the amplifiers 114, 118. The MAC 128 passes the packets containing the frequency domain data to the host 130, which processes the frequency domain data. In the spectrum analyzer operational mode, the MAC 128 may operate in a "pass-through" mode in which it passes packets without performing functions normally associated with MAC processing (e.g., sending acknowledge messages, extracting and checking CRCs, etc.). However, the MAC 128 is not required to perform any additional processing of the packets when in the spectrum analyzer mode. That is, at least some of the logic that the MAC 128 uses to process packets in the receiver mode might be used to pass through packets in the spectrum analyzer mode.

The host 130 includes a processor 132, a memory 134, and a display 136. In one embodiment, the host 130 has a device driver stored in the memory 134, which when executed on the processor 132 processes the frequency domain data. The host 130 may perform operations on the frequency domain such data as magnitude detection, windowing, scaling, and displaying the frequency domain data on the display 136. Thus, the wireless device 100 operates as a real-time spectrum analyzer, in this mode. Therefore, a network administrator could view the processed frequency domain data to determine what type of device is causing EM interference. The host 130 also sends a control signal ("mode select") to the baseband/MAC 120 to cause the baseband/MAC 120 to change between the receiver operational mode and the spectrum analyzer operational mode.

The example wireless receiver/spectrum analyzer operates as a baseband receiver. That is, the baseband/MAC 120 processes signals that have frequencies from about zero Hertz to some upper frequency. However, the present invention is not limited to baseband. In one embodiment, the wireless receiver/spectrum analyzer can operate as a passband receiver. In one embodiment, when in the receiver operational mode the wireless receiver/spectrum analyzer operates as a passband OFDM receiver.

Example Signal Processing Logic

Figure 2:
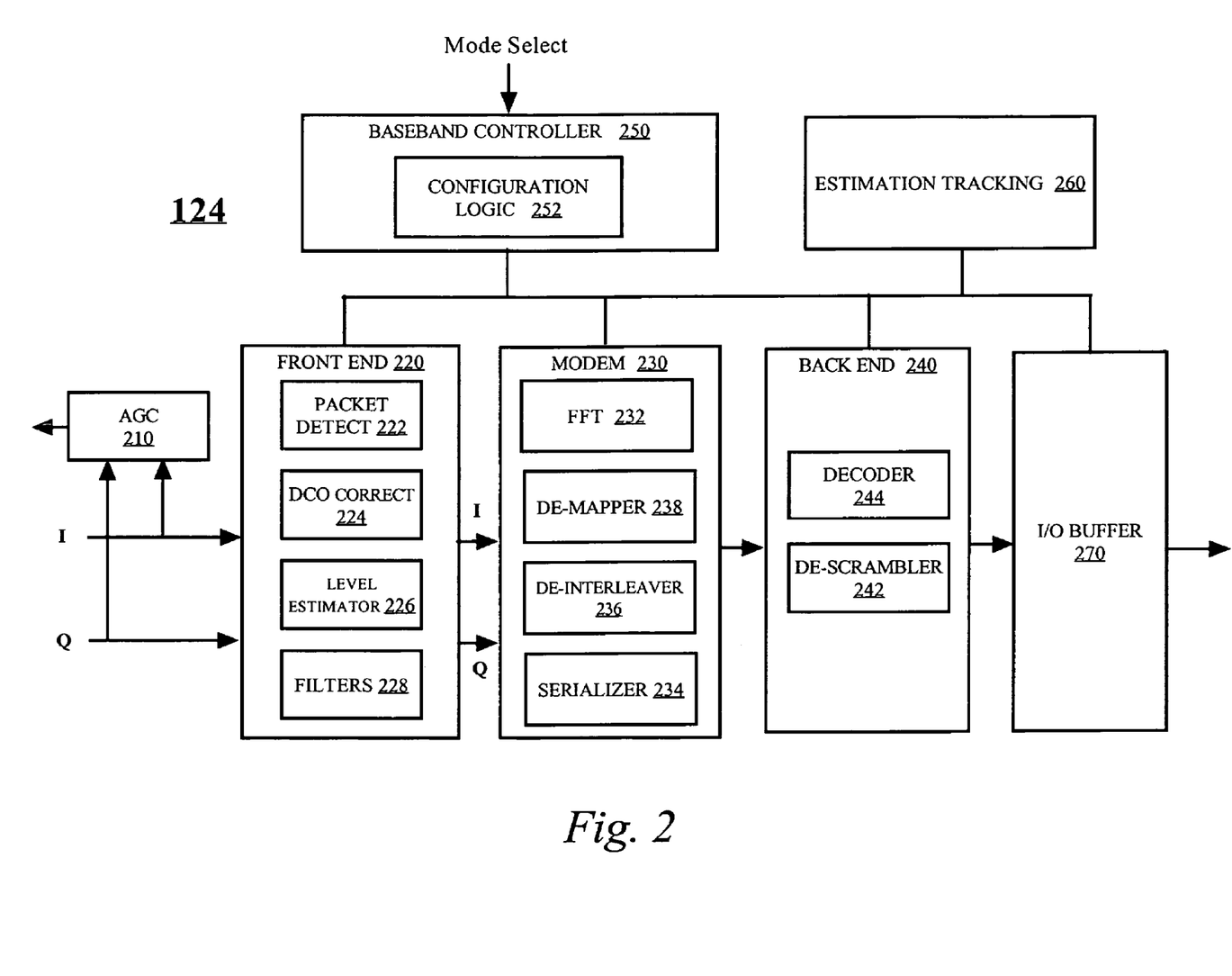
FIG. 2 is a block diagram that depicts details of signal processing logic that has modes of operation as a spectrum analyzer and as a receiver, according to an embodiment.

FIG. 2 is a block diagram that depicts details of signal processing logic 124 that is reconfigurable for use as a baseband receiver or as a frequency domain data generator, according to an embodiment. The frequency domain data, which describes signal strength versus frequency, may be further processed by another component, such as the host 130. The signal processing logic 124 may be used in the example wireless receiver 100 of FIG. 1. However, the signal processing logic 124 can be used in a different type of receiver. For example, the signal processing logic 124 could be used in a receiver that uses a different radio 110 than the one depicted in FIG. 1. Furthermore, the signal processing logic 124 could be used with a host 130 that is configured other than the host 130 of FIG. 1.

The signal processing logic 124 receives digitized I and Q signals from a DAC (not depicted in FIG. 2), processes the digitized I and Q signals, and outputs data from the I/O buffer 270. The I/O buffer 270 could output the data to a MAC 128; however, this is not required. For example, the data could be transferred by direct memory access (DMA) to the host 130. When used in the receiver operational mode, the signal processing logic 124 detects and processes packets, which are contained in the I and Q signals. When used in the spectrum analyzer operational mode, the signal processing logic 124 generates and outputs frequency domain data for the I and Q signals. Further, the signal processing logic 124 may process the I and Q signals without regard for the communication protocol (if any) used to transmit the I and Q signals. Note that is some cases, the I and Q signals will not be the result of a deliberate communication. As a particular example, the I and Q signals might be the result of microwave oven operation.

In general, the signal processing logic 124 of FIG. 2 includes automatic gain control (AGC) module 210, front-end module 220, modem module 230, back-end module 240, baseband controller module 250, estimation and tracking module 260, and input/output buffer module 270. The modules may be implemented by any combination of hardware and software. The modules are shown as separate units for convenience of illustration. The distribution of functions performed by the modules could be allocated other than as shown in FIG. 2.

The baseband controller module 250 controls the other modules, which process the I and Q signals. The baseband controller 250 has configuration logic 252 that is able to switch the signal processing logic 124 between the receiver operational mode and the spectrum analyzer operational mode. The configuration logic 252 could be firmware and/or state-machines. The configuration logic 252 changes the mode of the signal processing logic 124 in response to the "mode select" signal, which may be sent from the host 130. However, the mode select signal could be sent from a source other than the host 130. The configuration logic 252 switches from the receiver operational mode to the spectrum analyzer operational mode by changing data paths to bypass one or more modules or sub-modules, in one embodiment. For example, to achieve the spectrum analyzer operational mode, the back end module 240 and the packet detect sub-module 222 are bypassed, along with other modules and sub-modules, in one embodiment.

Various components of the signal processing logic 124 could be implemented in hardware, software, firmware, or some combination thereof. For example, the configuration logic 252 may be implemented in hardware or firmware. As a further example, the FFT 232 in the modem 230 might be implemented in a digital signal processor (DSP), a programmable logic device, such as a field programmable gate array (FPGA), or dedicated hardware, such as an application specific integrated circuit (ASIC).

Example Operation of Signal Processing Logic in Receiver Operational Mode

In the example signal processing logic 124 illustrated in FIG. 2, the signal processing logic 124 processes OFDM packets. OFDM can be used to transmit binary signals. Thus, in the receiver operational mode, the output of the signal processing logic 124 may be packets having data that correspond to an original bitstream that was coded and transmitted by a transceiver. When used in the receiver operational mode, the data flow associated with processing the I and Q signals is from the front end module 220, to the modem 230, to the back end module 240, and to the I/O buffer 270.

Processing of the I and Q signals begins with packet detection at the front end module 220. As an example, the packet detection sub-module 222 monitors for protocol specific preambles and data coding by, for example, using correlators designed to match known patterns in the packet preamble. As a particular example, the packet detection sub-module 222 could monitor for 802.11 specific preambles. The front end module 220 also performs DC offset correction 224, low pass filtering 228, and level estimation 226. In some implementations, it is only after detection of a packet that the remaining processing is done.

After the front end 220 detects the packets, the I and Q signals are passed to the modem 230, which demodulates the I and Q signals using a fast Fourier transform (FFT) 232 and a constellation demapper 238. The modem 230 also has a de-interleaver 236 for further processing.

The FFT 232 may be an "n" frequency bin FFT, by which it is meant that the FFT 232 outputs data into "n" frequency bins. As examples, "n" could be 64, 256, or some other convenient number. The frequency bins can cover any desired frequency range. Furthermore, the frequency range is an adjustable parameter. The frequency data in each bin pertain to a particular sampling period. Further, the FFT 232 operates separately on the I signal ("real component") and Q signal ("imaginary component"). Therefore, for each sampling period, the FFT 232 outputs data into "n" frequency bins for the real component and "n" frequency bins for the imaginary component. The frequency data for the real component and imaginary component are later combined.

Because the FFT 232 outputs the data into "n" frequency bins for a given sample of the I signal (or Q signal), these "n" bins will be referred to as parallel data. The previously mentioned serializer 234 combines this parallel data in the frequency bins into a serial stream. The serialized data are passed to the back end module 240, which performs decoding for error correction and de-scrambling. The output of the back end module 240 is an estimate of the original binary stream that was transmitted by the transmitter.

The I/O buffer 270 stores the packets when they are ready to be shipped to the MAC 128. Each packet has a receive vector, which contains information about the packet such as data transmission rate, and packet size. Each packet also has a payload that comprises a MAC header and the data (e.g., the original bitstream from the transceiver). The packetized data are sent from the I/O buffer 270 to the MAC 128. The baseband controller 250 may assist in forming the packets.

The automatic gain control (AGC) module 210 controls signal levels in the radio 110, based on the magnitude of the I and Q signals. The estimation and tracking module 260 corrects for frequency and timing offsets.

Modifying the Signal Processing Logic to Spectrum Analyzer Operational Mode

Reconfiguring the signal processing logic 124 can include bypassing one or more components that are typically included in signal processing logic 124. Examples of components that may be bypassed include, but are not limited to, a packet detector, a cyclic prefix removal, a constellation demapper, de-interleaving, a decoder, and a scrambler.

Figure 3:
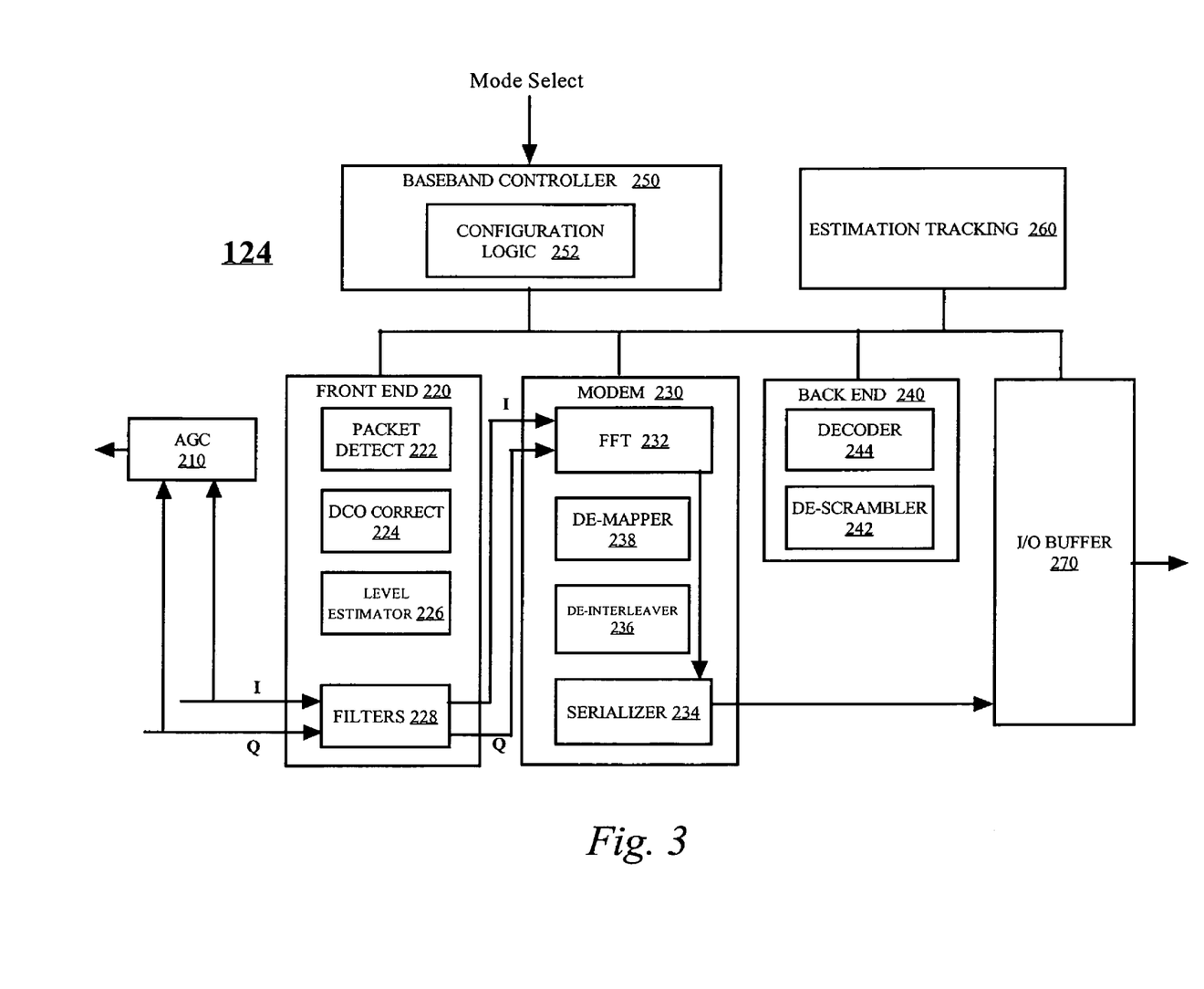
FIG. 3 is a block diagram that depicts the signal processing logic of FIG. 2 re-configured for real-time spectrum analysis, according to an embodiment.

FIG. 3 is a block diagram that depicts the signal processing logic 124 of FIG. 2 re-configured for generating frequency data for use as a real-time spectrum analyzer, according to an embodiment. However, signal processing logic 124 other than the embodiment of FIG. 2 can be reconfigured into a real-time spectrum analyzer. In the embodiment of FIG. 3, OFDM processing is reconfigured to result in a general-purpose real-time spectrum analyzer. The re-configuration is achieved by the configuration logic 252 changing data paths to bypass various modules and sub-modules, in one embodiment. However, the re-configuration might be achieved by other means.

The following is a brief discussion of which modules and sub-modules are bypassed and not bypassed in the embodiment depicted in FIG. 3. In the front end module 220, the packet detection 222 is bypassed, as is the DC offset correction 224 and signal level estimation 226. The front end filters 228 are not bypassed. In the modem 230, the de-mapper 238 and de-interleaver 236 are bypassed. The FFT 232 and serializer 234 are not bypassed. The entire back end module 240 is bypassed. The I/O buffer 270 is not bypassed. The modules and sub-modules that are bypassed are for purposes of illustration.

Example Operation of Signal Processing Logic Configured Spectrum Analyzer

Referring to FIG. 3, the data flow when used as a real-time spectrum analyzer proceeds from the filters 228 in the front end 220, to the FFT 232, to the serializer 234, and then to the I/O buffer 270.

When operating in the spectrum analyzer operational mode, as illustrated in FIG. 3, signals are processed continuously without consideration of protocol preambles or data coding. For example, packet detection is not performed, in this embodiment. The filtered I and Q signals are input to the FFT 232 where the time-domain I and Q signals are processed to generate frequency domain data. The FFT 232 operates on the I and the Q signals separately to generate frequency domain data for the I signal (real) and the Q signal (imaginary). For example, the frequency domain data describes power versus frequency for the real and imaginary component. Then, the FFT 232 combines the real and imaginary components and outputs one set of frequency domain data to the serializer 234. The FFT 232 does not need to be modified in order to generate the frequency domain data.

The frequency domain data from the serializer 234 are packetized and stored in the I/O buffer 270. The baseband controller 250 may be used to generate the packets. As do the packets in the receiver operational mode, the packets in the spectrum analyzer operational mode have a vector of information. However, the vector in spectrum analyzer operational mode has special fields related to the spectrum analyzer. For example, these special fields describe the size of the packets, the scaling, channel, etc. The scaling information may be based on the gain of the amplifiers 114, 118, as well as other factors. For example, the AGC might be configured to run continuously such that the amplifier gains are continuously changing or be configured such that the amplifier gains are fixed.

Higher level processing of the frequency domain data is accomplished through changes in the MAC 128 and in the host 130. The changes to the MAC 128 are to operate the MAC 128 in a pass through mode, in one embodiment. In the pass through mode, the MAC 128 does not perform normal media access control functions. In one embodiment, the signal processing logic 124 does not transfer the frequency domain data to the MAC 128. Instead the frequency domain data are transferred from the signal processing logic 124 to the host 130 by direct memory access, in one embodiment.

Example Process Flow

Figure 4:
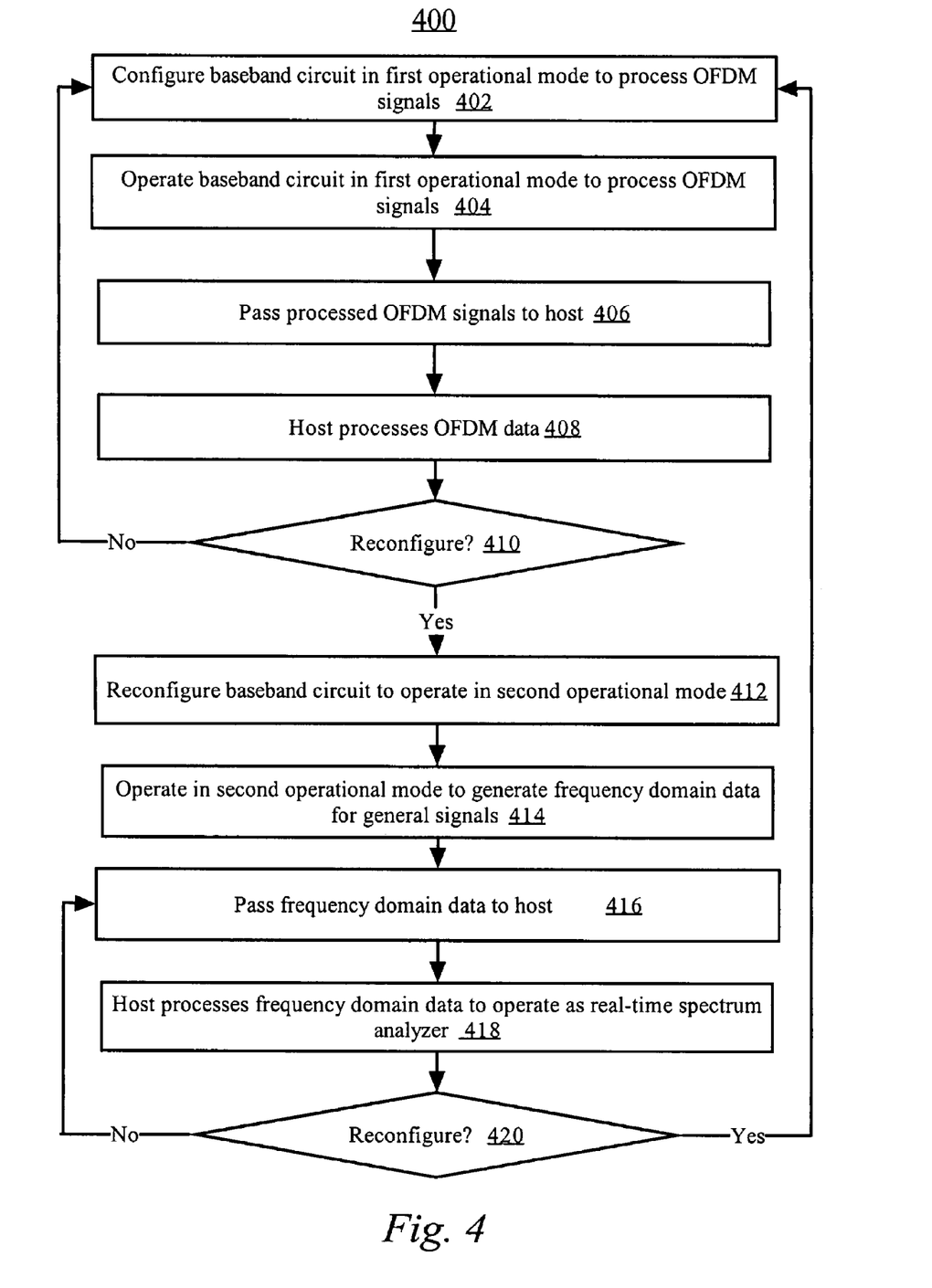
FIG. 4 is a flowchart illustrating operating a device in either a receiver mode or real-time spectrum analyzer mode, according to an embodiment.

FIG. 4 is an example process flow 400 for reconfiguring a wireless receiver 100 between a receiver operational mode and a real-time spectrum analyzer operational mode, in accordance with an embodiment. FIG. 4 describes an embodiment pertaining to OFDM; however, the present invention is not limited to OFDM. In step 402, the wireless receiver 100 is caused to operate as an OFDM receiver. This may be the default operational mode upon power on or reset of the wireless receiver 100.

In step 404, the wireless receiver 100 is operated in the receiver operational mode, wherein OFDM data are processed. In step 406, the OFDM data are passed to the host 130. In step 408, the host 130 processes the OFDM data. Thus, the wireless receiver 100 operates as an OFDM receiver.

At some point, the host 130 sends a mode select signal to signal processing logic 124 in the wireless receiver 100 for the signal processing logic 124 to change it mode of operation to a spectrum analyzer mode (step 410). For example, a network administrator may wish to determine what EM radiation in the vicinity is causing interference. The host 130 has a user interface that allows the user to cause the wireless receiver 100 to enter the spectrum analyzer operational mode, in one embodiment. In response to the host 130 sending the mode select signal, the signal processing logic 124 causes itself to operate in spectrum analyzer operational mode, in step 412. Examples of how to reconfigure the signal processing logic 124 have already been discussed herein.

In step 414, the signal processing logic 124 operates in the spectrum analyzer operational mode in which frequency domain data are generated for general EM radiation received by a radio antenna 112. By general EM radiation it is meant that the EM radiation could be any EM radiation. For example, the general EM radiation might not be due to wireless communication, although it could be. In step 416, the frequency domain data are passed to the host 130. In step 418, the host 130 processes the frequency domain data, wherein the wireless receiver 100 operates as a real-time spectrum analyzer.

At some point in time, the wireless receiver 100 is configured back to the receiver operational mode. This may be initiated by a user entering one or more commands to the host 130, wherein the host 130 sends a mode select signal to the signal processing logic 124 (step 420).

Implementation Mechanisms and Hardware Overview

The approach for spectrum analysis described herein may be implemented in a variety of ways and the invention is not limited to any particular implementation. The approach may be integrated into a wireless communications system or a wireless device, or may be implemented as a stand-alone mechanism. Furthermore, the approach may be implemented in computer software, hardware, or a combination thereof.

Figure 5:
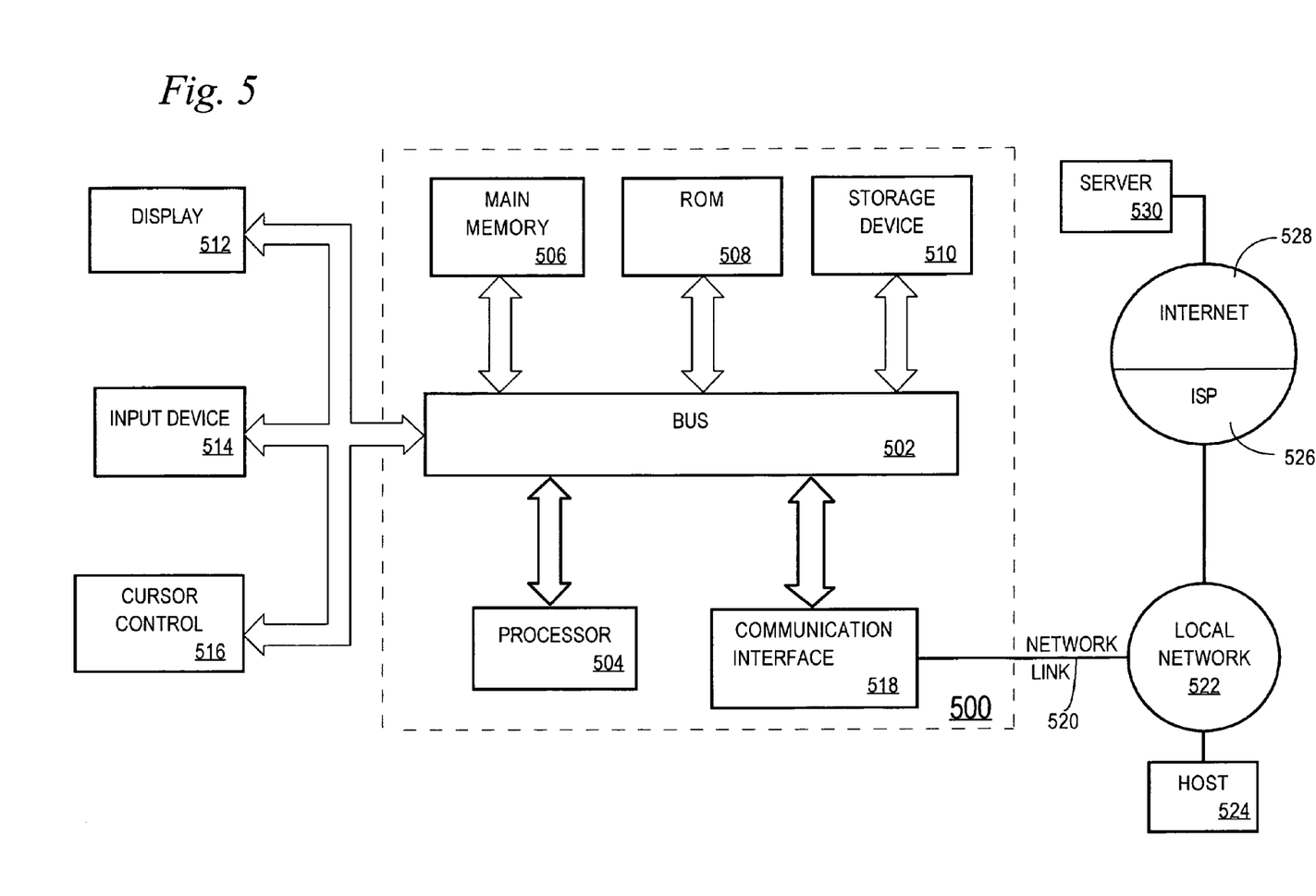
FIG. 5 is a block diagram that depicts a computer system upon which embodiments of the invention may be implemented.

FIG. 5 is a block diagram that depicts a computer system 500 upon which an embodiment may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, EM or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, EM or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

Extensions and Alternatives

In the foregoing description, the invention has been described with reference to specific embodiments thereof. It will, however, be evident that various modifications and changes may be made thereto without departing from the broader spirit and scope of the invention. For example, although examples have illustrated the use of OFDM, that is just an example of the type of communications protocols that can be used, and thus OFDM is used for explanation purposes only as embodiments of the invention are not limited to any particular type of communications protocol. Further, although examples have illustrated the use of a baseband receiver that is just an example. For example, the receiver might also be a passband receiver. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A device, comprising:
a first operational mode in which the device is operable to use a fast Fourier transform (FFT) component to process, in accordance with a communication protocol, first signals received by the device to determine communication data encoded in the first signals and to output the communication data;
a second operational mode in which the device is operable to generate and output frequency domain data representing second signals received by the device, wherein the frequency domain data includes strength of the second signals versus frequency of the second signals and wherein in the second operational mode the device is configured to use the FFT component to process the second signals and to use logic that packetizes data that has been processed by the FFT component, wherein the frequency domain data are output in packets; and
logic that is operable to cause the device to operate in the first operational mode and the second operational mode, wherein the second operational mode is realized by selective bypassing of at least one portion of components used in the first operational mode.

2. The device of claim 1, wherein the logic that is operable to cause the device to operate in the first operational mode and the second operational mode is operable to reconfigure the device between a first configuration and a second configuration.

3. The device of claim 1, wherein in the first operational mode the device is configured to use packet detection logic to detect packets in the first signals received by the device.

4. The device of claim 3, wherein in the second operational mode the device bypasses the packet detection logic.

5. The device of claim 1, further comprising media access control (MAC) logic that in the second operational mode is operable to receive the packets and pass the packets to a host without performing media access control functions.

6. The device of claim 1, wherein in the first operational mode the device operates as an orthogonal frequency division multiplexed (OFDM) receiver.

7. The device of claim 1, wherein the logic that is operable to cause the device to operate in the first operational mode and the second operational mode is operable to switch circuit datapaths to switch between the first operational mode and the second operational mode.

8. The device of claim 1, wherein in the first operational mode the device comprises a constellation demapper to demap symbols in orthogonal frequency division multiplexed (OFDM) signals and wherein in the second operational mode the device is configured to bypass the constellation demapper.

9. A wireless communications apparatus comprising:
a radio circuit that is configured to receive electromagnetic radiation;
a host processor;
signal processing logic coupled to the radio circuit to receive signals based on the electromagnetic radiation; and
logic that is operable to cause the signal processing logic to operate in a first operational mode and a second operational mode;
wherein, in the first operational mode, the signal processing logic is operable to process the signals in accordance with a communication protocol to determine communication data encoded in the signals and to output the communication data to the host processor, wherein in the first operational mode the signal processing logic comprises packet detection logic to detect packets in the signals;
wherein, in the second operational mode, the signal processing logic is operable to generate frequency domain data based on the signals and to pass the frequency domain data to the host processor, wherein the frequency domain data describe strength versus frequency of the electromagnetic radiation, wherein in the second operational mode the signal processing logic is configured to bypass the packet detection logic;

wherein, in the first operational mode, the host is operable to process the communication data to operate as a receiver; and wherein, in the second operational mode, the host is operable to process the frequency domain data to operate as a spectrum analyzer.

10. The wireless communications apparatus of claim 9, wherein the logic that is operable to cause the signal processing logic to operate in the first operational mode and the second operational mode is operable to change the signal processing logic between a first configuration and a second configuration.

11. The apparatus of claim 9, wherein:
the signal processing logic includes a fast Fourier transform (FFT) component to process the signals in the first operational mode; and
the signal processing logic includes the fast Fourier transform component to process the signals in the second operational mode.

12. The apparatus of claim 11, wherein in the second operational mode the signal processing logic comprises logic that packetizes data that has been processed by the fast Fourier transform component, wherein the frequency domain data are output to the host processor in packets.

13. The apparatus of claim 12, wherein the apparatus comprises media access control (MAC) logic that in the second operational mode is operable to receive the packets and pass the packets to the host processor without performing media access control functions.

14. The apparatus of claim 9, wherein in the first operational mode the apparatus operates as an orthogonal frequency division multiplexed (OFDM) receiver.

15. The apparatus of claim 9, wherein the logic that is operable to cause the signal processing logic to operate in the first operational mode and the second operational mode is operable to switch circuit datapaths to change between the first operational mode and the second operational mode.

16. A method comprising:
operating signal processing logic in a first operational mode in which the signal processing logic is operable to process orthogonal frequency division multiplexed (OFDM) signals and to transfer processed OFDM data to a host, wherein operating the signal processing logic in the first operational mode includes detecting packets in signals received by the signal processing logic;
in response to a control signal from the host, causing the signal processing logic to operate in a second operational mode that is operable to generate frequency domain data representing general electromagnetic radiation and to pass the frequency domain data to the host, wherein causing the signal processing logic to operate in the second operational mode comprises bypassing logic that detects packets;
while the signal processing logic is in the first operational mode, the host processing the processed OFDM data; and
while the signal processing logic is in the second operational mode, the host processing the frequency domain data to operate as a spectrum analyzer.

17. The method of claim 16, further comprising switching circuit datapaths to switch from the first operational mode to the second operational mode.

18. A method comprising:
operating signal processing logic in a first operational mode in which the signal processing logic is operable to process orthogonal frequency division multiplexed (OFDM) signals and to transfer processed OFDM data to a host, while in the first operational mode, processing the OFMD signals using a fast Fourier transform (FFT) component;
in response to a control signal from the host, causing the signal processing logic to operate in a second operational mode that is operable to generate frequency domain data representing general electromagnetic radiation and to pass the frequency domain data to the host, while in the second operational mode, processing signals based on the general electromagnetic radiation using the FFT component;
while the signal processing logic is in the first operational mode, the host processing the processed OFDM data; and
while the signal processing logic is in the second operational mode, the host processing the frequency domain data to operate as a spectrum analyzer.

19. A method comprising:
operating signal processing logic in a first operational mode in which the signal processing logic is operable to process orthogonal frequency division multiplexed (OFDM) signals and to transfer processed OFDM data to a host;
in response to a control signal from the host, causing the signal processing logic to operate in a second operational mode that is operable to generate frequency domain data representing general electromagnetic radiation and to pass the frequency domain data to the host, while in the second operational mode, packetizing the frequency domain data;
while the signal processing logic is in the first operational mode, the host processing the processed OFDM data; and
while the signal processing logic is in the second operational mode, the host processing the frequency domain data to operate as a spectrum analyzer.

20. A method comprising:
operating signal processing logic in a first operational mode in which the signal processing logic is operable to process orthogonal frequency division multiplexed (OFDM) signals and to transfer processed OFDM data to a host, while in the first operational mode, performing media access control functions using a media access controller (MAC);
in response to a control signal from the host, causing the signal processing logic to operate in a second operational mode that is operable to generate frequency domain data representing general electromagnetic radiation and to pass the frequency domain data to the host, while in the second operational mode, using the MAC in a pass through mode in which media access control functions are not performed;
while the signal processing logic is in the first operational mode, the host processing the processed OFDM data; and
while the signal processing logic is in the second operational mode, the host processing the frequency domain data to operate as a spectrum analyzer.

21. A method comprising:
operating signal processing logic in a first operational mode in which the signal processing logic is operable to process orthogonal frequency division multiplexed (OFDM) signals and to transfer processed OFDM data to a host;

in response to a control signal from the host, causing the signal processing logic to operate in a second operational mode that is operable to generate frequency domain data representing general electromagnetic radiation and to pass the frequency domain data to the host, and wherein the signal processing logic operating in the second operational mode includes one or more of bypassing de-interleaving that is used in the first operational mode, bypassing decoding that is used in the first configuration, bypassing de-scrambling that is used in the first configuration and bypassing cyclic prefix removal logic that is used in the first configuration;

while the signal processing logic is in the first operational mode, the host processing the processed OFDM data; and while the signal processing logic is in the second operational mode, the host processing the frequency domain data to operate as a spectrum analyzer.

22. A wireless communications apparatus comprising:
a radio circuit that is configured to receive electromagnetic radiation;
a host processor;
signal processing logic coupled to the radio circuit to receive signals based on the electromagnetic radiation; and
logic that is operable to cause the signal processing logic to operate in a first operational mode and a second operational mode;
wherein, in the first operational mode, the signal processing logic is operable to process the signals in accordance with a communication protocol to determine communication data encoded in the signals and to output the communication data to the host processor and wherein in the first operational mode the signal processing logic is configured to use a constellation demapper to demap symbols in orthogonal frequency division multiplexed (OFDM) signals;
wherein, in the second operational mode, the signal processing logic is operable to generate frequency domain data based on the signals and to pass the frequency domain data to the host processor, wherein the frequency domain data describe strength versus frequency of the electromagnetic radiation and wherein in the second operational mode the signal processing logic is configured to bypass the constellation demapper;
wherein, in the first operational mode, the host processor is operable to process the communication data to operate as a receiver; and
wherein, in the second operational mode, the host processor is operable to process the frequency domain data to operate as a spectrum analyzer.

23. The wireless communications apparatus of claim 22, wherein the logic that is operable to cause the signal processing logic to operate in the first operational mode and the second operational mode is operable to change the signal processing logic between a first configuration and a second configuration.

24. The apparatus of claim 22, wherein in the second operational mode the signal processing logic generates the frequency domain data in packet form.

25. The apparatus of claim 24, wherein the apparatus comprises media access control (MAC) logic that in the second operational mode is operable to receive the frequency domain data in packet form and pass the frequency domain data in packet form to the host processor without performing media access control functions.

26. The apparatus of claim 22, wherein in the first operational mode the apparatus operates as an orthogonal frequency division multiplexed (OFDM) receiver.

27. The apparatus of claim 22, wherein the logic that is operable to cause the signal processing logic to operate in the first operational mode and the second operational mode is operable to switch circuit datapaths to change between the first operational mode and the second operational mode.

28. The apparatus of claim 22, wherein in the first operational mode the signal processing logic is configured to use a constellation demapper to demap symbols in orthogonal frequency division multiplexed (OFDM) signals and wherein in the second operational mode the signal processing logic is configured to bypass the constellation demapper.

29. A wireless communications apparatus comprising:
a radio circuit that is configured to receive electromagnetic radiation;
a host processor;
signal processing logic coupled to the radio circuit to receive signals based on the electromagnetic radiation, wherein the signal processing logic includes a fast Fourier transform (FFT) component; and
logic that is operable to cause the signal processing logic to operate in a first operational mode and a second operational mode;
wherein, in the first operational mode, the signal processing logic is operable to use the FFT component to process the signals in accordance with a communication protocol to determine communication data encoded in the signals and to output the communication data to the host processor;
wherein, in the second operational mode, the signal processing logic is operable to use the FFT component to generate frequency domain data based on the signals and to pass the frequency domain data to the host processor, wherein the frequency domain data describe strength versus frequency of the electromagnetic radiation;
wherein, in the first operational mode, the host processor is operable to process the communication data to operate as a receiver; and
wherein, in the second operational mode, the host processor is operable to process the frequency domain data to operate as a spectrum analyzer.

* * * * *